United States Patent

[11] 3,599,437

[72] Inventor Joseph F. Panas
Arlington, Mass.
[21] Appl. No. 16,101
[22] Filed Mar. 3, 1970
[45] Patented Aug. 17, 1971
[73] Assignee The United States of America as represented by the Secretary of the Air Force

[54] THERMOELECTRIC COOLING DEVICE
1 Claim, 2 Drawing Figs.

[52] U.S. Cl. .......... 62/3, 62/426, 62/333
[51] Int. Cl. .......... F25b 21/02
[50] Field of Search .......... 62/3; 1/333

[56] References Cited
UNITED STATES PATENTS
664,776 12/1900 Portes .......... 62/3
3,004,393 10/1961 Alsing .......... 62/3

*Primary Examiner*—William J. Wye
*Attorneys*—Harry A. Herbert, Jr. and Arsen Tashjian ABSTRACT: A thermoelectric cooling device. Thermoelectric modules are interposed between two cylindrical rotors of the type similar to centrifugal fan rotors, with the vanes of the rotors hollowed and filled with a reflux heat transfer fluid. The hollow vanes have fins attached to them. The thermoelectric modules are fed by a direct current source and cause one rotor to get cold and the by, rotor to get hot. The air which is flowing by, and near, each rotor becomes cool or warm, as the case may be. Shrouds around the rotors direct the air flows. The rotors and the thermoelectric modules are rotated, as one unit, by an electric motor.

INVENTOR.
JOSEPH F. PANAS
BY Harry A. Herbert Jr. and
Arsen Tashjian
ATTORNEYS

THERMOELECTRIC COOLING DEVICE

BACKGROUND OF THE INVENTION

This invention relates to a thermoelectric device and, more particularly, to a thermoelectric device which is ideally suited for use as an air conditioner.

Thermoelectric devices are well known. They are based upon the fact that, when a direct current is passed through two materials which have dissimilar thermoelectric properties and are physically joined, the junction becomes hot or cold, depending upon the direction of the current with regard to the relative position of the two materials. The phenomena is referred to as the Peltier effect and an arrangement of the materials is called a thermopile.

It is equally well known that conventional air conditioning devices consist of three distinct components, i.e., heat pump, heat exchanger, and air mover. The air mover, usually a fan, is used primarily to force the air through the heat exchanger and is used secondarily to circulate the air through the room or other area being cooled.

My invention is a radical departure from conventional practice in that the entire cooling device, rather than only the air mover, moves, i.e., rotates; and, my invention constitutes a significant advancement in the state of the art, since it eliminates or substantially reduces much of the inefficiency in the air moving process.

SUMMARY OF THE INVENTION

This invention relates to a thermoelectric cooling device which is ideally suited for use as an air conditioner, which incorporates the dual functions of the air mover and the heat exchanger into one component, and which eliminates or substantially reduces the inefficiency in the air moving process.

Therefore, an object of this invention is to provide a device which may be efficiently used generally as an air cooling device and specifically as an air conditioner.

Another object of this invention is to provide a cooling device which combines the dual functions of the air mover and the heat exchanger.

Still another object of this invention is to provide a cooling device which eliminates or substantially reduces the inefficiency in the air moving process.

These, and still other and related, objects of this invention will become readily apparent after a consideration of the description of the invention and reference to the drawings.

DESCRIPTION OF THE PREFERRED EMBODIMENT

Figure 1:
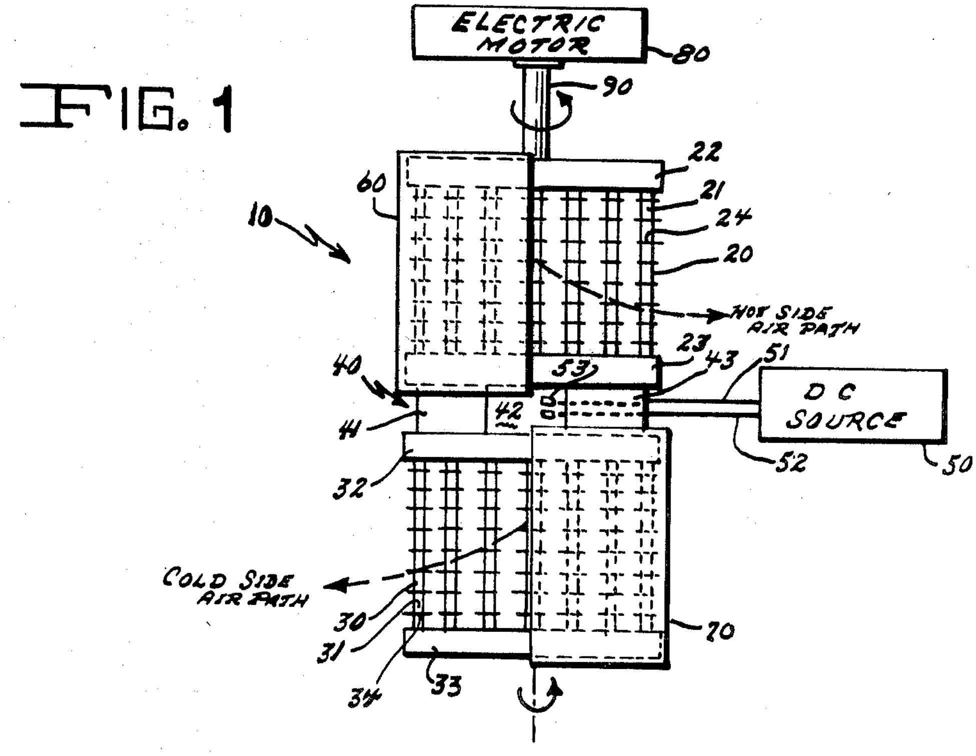
FIG. 1 is a plan view, in schematic form, of a preferred embodiment of the invention.

With reference to FIG. 1, therein is shown, in schematic form, a preferred embodiment 10 of the invention, which includes: cylindrical rotors 20 and 30, similar to centrifugal fan rotors, with vanes or blades, such as 21 and 31, which are hollow and which act as conduits between reservoir tanks 22 and 23, 32 and 33 that contain reflux heat transfer fluid; fins, such as 24 and 34, attached to the external surface of the hollow vanes or blades, such as 21 and 31; a thermoelectric module subassembly or thermopile 40, with thermoelectric modules, such as 41, 42 and 43, interposed between and affixed to one end of cylindrical rotors 20 and 30, and in electrical connection with direct current source 50 through leads 51 and 52 through a slip rings and brushes arrangement 53; and directional shrouds 60 and 70 adjacent to and external of, respectively, rotors 20 and 30 to direct the air flow as indicated. Also shown is electric motor 80 with suitable means, such as shaft 90, for rotating, as one unit, rotors 20 and 30 and thermoelectric module subassembly 40.

Figure 2:
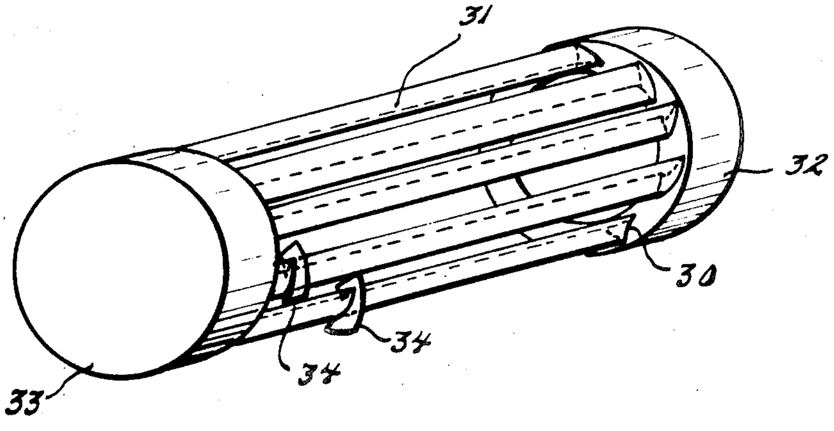
FIG. 2 is a perspective view, in diagrammatic form, of a major component of the preferred embodiment shown in FIG. 1.

With reference to FIG. 2, therein is shown cylindrical rotor 30, having vanes or blades such as 31, fins such as 34, and reflux fluid reservoir tanks 32 and 33.

MODE OF OPERATION OF THE PREFERRED EMBODIMENT

In essence, the preferred embodiment 10 operates as follows: When electric motor 80 is energized, it rotates shaft 90 which, in turn, rotates rotors 20 and 30 and thermopile or thermoelectric module subassembly 40. Direct current source 50, leads 51 and 52, and shrouds 60 and 70 are not rotated. Simultaneously, thermoelectric modules such as 41, 42 and 43 are fed direct current from source 50 through leads 51 and 52 through slip rings and brushes arrangement 53, with junctions becoming hot or cold, depending upon the direction of the current with regard to the relative position of the two materials of each thermoelectric module. For use in embodiment 10 the thermoelectric modules are arrayed so that they are cold on one side and are warm on the other. With the rotation of rotors 20 and 30, and because of the positioning of shrouds 50 and 60, a cold airflow path and a hot airflow path are established. The embodiment may be used, therefore, to cool a desired area and the like.

While there has been shown and described the fundamental features of the invention, as applied to a particular embodiment, it is to be understood that this is by way of illustration only and is not intended as a limitation, and that various substitutions and omissions may be made by those skilled in the art without departing from the spirit of the invention.

What I claim is:

1. A thermoelectric cooling device, comprising:

a. two axially aligned cylindrical rotors having:

1. reservoirs, containing reflux transfer fluid, affixed at each end of each said rotor;
   2. a plurality of hollow vanes disposed externally around, and parallel to the common axis of, said rotors, with said vanes attached to said rotors, and joining, and serving as conduits between, said reservoirs of each said rotor;
   3. fins attached to, and extending outwardly from, said hollow vanes;

b. shrouds, positioned adjacent to and external of said rotors to direct airflow in the desired direction;

c. a thermoelectric subassembly, in electrical connection with a source of direct current, interposed between, and connected to, said axially aligned cylindrical rotors;

d. and, means for rotating, as one unit, said two axially aligned cylindrical rotors and said thermoelectric subassembly.